United States Patent
Yeakley et al.

(10) Patent No.: US 9,824,706 B2
(45) Date of Patent: Nov. 21, 2017

(54) ROTARY ACTUATOR WITH COIL WINDING PORTIONS HAVING OPPOSING CURRENT FLOW DIRECTIONS

(71) Applicant: Oracle International Corporation, Redwood City, CA (US)

(72) Inventors: Darryl Wayne Yeakley, Erie, CO (US); Frank A. Goodknight, Niwot, CO (US); Steven G. Suttle, Broomfield, CO (US)

(73) Assignee: Oracle International Corporation, Redwood City, CA (US)

( * ) Notice: Subject to any disclaimer, the term of this patent is extended or adjusted under 35 U.S.C. 154(b) by 425 days.

(21) Appl. No.: 14/068,368

(22) Filed: Oct. 31, 2013

(65) Prior Publication Data
US 2015/0116866 A1    Apr. 30, 2015

(51) Int. Cl.
*G11B 17/08*    (2006.01)
*G11B 5/53*    (2006.01)
*H02K 41/035*    (2006.01)

(52) U.S. Cl.
CPC .............. *G11B 5/53* (2013.01); *G11B 5/535* (2013.01); *H02K 41/0358* (2013.01)

(58) Field of Classification Search
CPC ..... G11B 5/5513; G11B 5/5517; H02K 16/02
USPC ...... 360/98.07, 99.04, 99.08; 310/75 R, 112, 310/114
See application file for complete search history.

(56) References Cited

U.S. PATENT DOCUMENTS

| | | |
|---|---|---|
| 5,434,549 A | 7/1995 | Hirabayashi |
| 5,440,183 A | 8/1995 | Denne |
| 6,037,739 A | 3/2000 | Hartramph |
| 7,538,980 B2 | 5/2009 | Harper |
| 8,254,045 B1 | 8/2012 | Benner |
| 8,415,838 B1 | 4/2013 | Eghbal |
| 2012/0170153 A1* | 7/2012 | Yeakley et al. ............... 360/241 |

* cited by examiner

*Primary Examiner* — Gustavo Polo
(74) *Attorney, Agent, or Firm* — Marsh Fischmann & Breyfogle LLP; Jonathon A. Szumny

(57) ABSTRACT

A rotary actuator for positioning a recording head in a data storage mechanism and that includes first and second cylindrical subassemblies separated by an air gap. One of the subassemblies includes a magnetically conductive core with an electrically conductive coil wrapped thereover to enable first and second current flow directions in the circuit. The other of the subassemblies includes a magnetically conductive core and at least one magnet secured thereto. Transmission of an electric current through the electrically conductive coil induces rotation of one of the subassemblies relative to the other of the subassemblies to rotate the recording head about an axis that is perpendicular to recording media on the recording head. The disclosed rotary actuator facilitates quick and accurate recording head position changes due to low inertia of the rotating subassembly as well as reduced inductance and symmetrical mass distribution of the actuator.

20 Claims, 12 Drawing Sheets

SECTION B-B

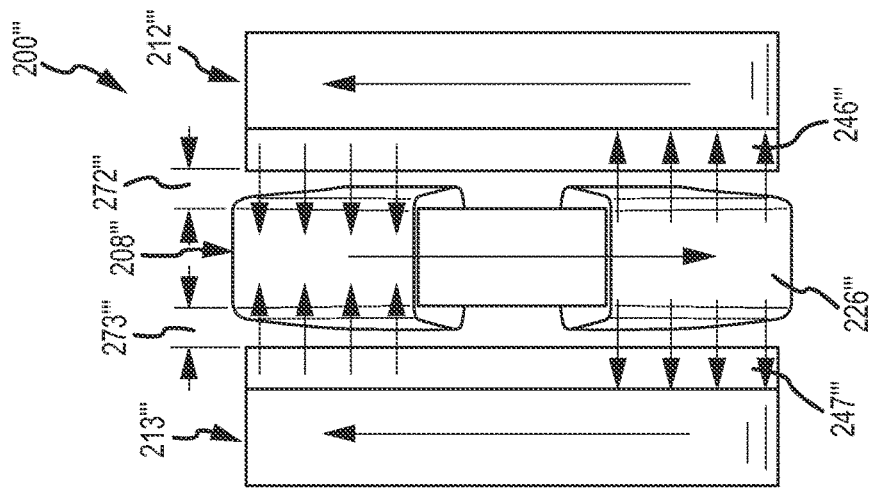
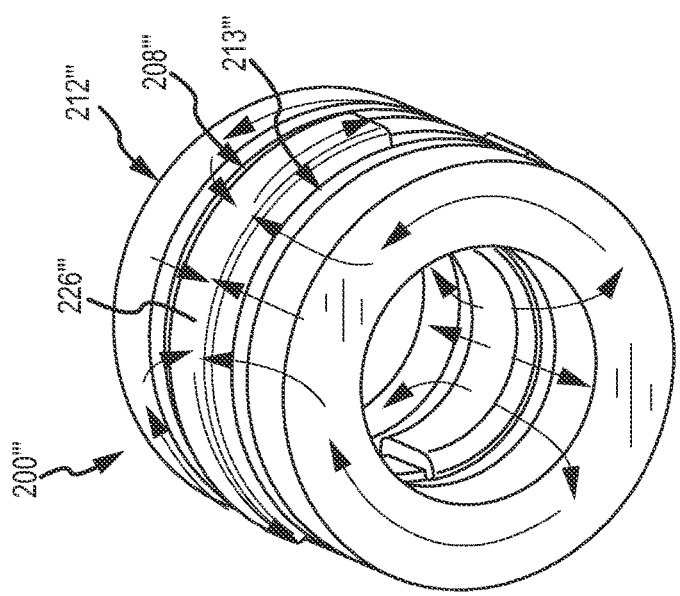

ROTARY ACTUATOR WITH COIL WINDING PORTIONS HAVING OPPOSING CURRENT FLOW DIRECTIONS

BACKGROUND

1. Field of the Invention

The present invention generally relates to data storage devices such as tape and disk drives and, more particularly, to rotary actuators that angularly position read and/or write heads relative to recording media in tape and disk drives.

2. Relevant Background

Tape drives have been widely employed in industry for over thirty years due to their ability to store large amounts of data on a relatively small and inexpensive removable format. Typically, a removable cartridge holding a reel or spool of storage tape is initially loaded into a tape drive. After coupling the storage tape on the cartridge reel to a take-up reel of the tape drive (e.g., via respective leaders), the tape is unwound from the cartridge supply reel, moved past one or more tape head assemblies (e.g., each having one or more tape heads with one or more read/write/servo elements/transducers in the case of magnetic tape) or optical pickup units (OPUs) (e.g., in the case of optical tape) for reading and/or writing of data, and wound onto the take-up reel via a drive motor. Next, the tape is unwound from the take-up reel, moved past the tape heads or OPUs, and wound onto the cartridge. The storage tape is uncoupled from the take-up reel prior to removing the cartridge from the tape drive.

A head assembly of a tape or disk drive typically includes a number of positioning subassemblies that allow a servo control system of the drive to accurately position the one or more heads relative to the recording media (e.g., to magnetic tape or disks) in a number of different manners. For instance, one positioning subassembly may include a coarse linear motor and corresponding travel carriage that is configured to linearly move the one or more tape heads in a lateral (e.g. perpendicular) direction relative to the direction of motion of the media. Another positioning subassembly may include a fine linear motor and corresponding travel carriage that is configured to linearly move the one or more tape heads relative to the coarse travel carriage and in a lateral direction relative to the direction of motion of the media over a finer range of motion than that of the coarse travel carriage.

Another positioning subassembly of a tape or disk drive may include a rotary actuator that is configured to angularly position the one or more tape heads relative to the recording media (and the coarse travel carriage) about an axis that is perpendicular to the recording media (e.g., to the magnetic tape) as well as to the direction or path of motion of the recording media. The angular head motion allows the servo readers and/or the read/write elements on the head to be aligned correctly to the media during track following and/or during read/write operations. For instance, the rotary actuator may be attached to a read/write head by means of a carriage (e.g., the fine travel carriage) or other supporting structure.

Generally, a rotary actuator includes an electrically conductive coil that is wrapped about a coil holder. The wrapped coil holder is disposed relative to one or more stationary magnets (e.g., with an air gap between the electrically conductive coil and the permanent magnetic). Upon application of an electric current through the coil (e.g., in response to a bi-directional analog control signal), the coil current interacts with the magnetic field from the permanent magnet(s) to induce rotary motion of the coil relative to the stationary magnet(s) and thus of the read and/or write head(s).

SUMMARY

Read and write head positioning requirements are typically "high bandwidth" which means that head position changes must be made quickly and accurately. In the case of rotary actuators having a given torque constant (Kt), there are a number of actuator design characteristics that have a direct impact on their ability to move a recording head both quickly and accurately. One characteristic is the amount of inertia that the moving part of the rotary actuator adds to the inertia already present in the head and supporting structure it will be moving. Limiting the inertia of the rotary actuator allows for improved bandwidth capabilities. Another characteristic is the actuator's inductance where limiting such inductance allows for decreased current rise time which in turn improves bandwidth capabilities. A further characteristic is mass distribution of the moving portion of the actuator. Specifically, out-of-plane resonances that create dynamic instabilities can occur when the mass of the moving part of the rotary actuator is widely and/or asymmetrically distributed about the actuation axis.

Existing rotary actuators have a number of deficiencies that limit their ability to satisfy high bandwidth positioning requirements. In one regard, the moving coil of existing rotary actuators has significant inertia in relation to the mass of the read and/or write head it is moving. In another regard, the widely and asymmetrically distributed nature of the coil mass about the rotary actuation axis results in out-of-plane resonances during movement of the coil. Still further, conventional actuators also often have high inductance which leads to reduced bandwidth capabilities.

In this regard, disclosed herein is a rotary actuator for positioning one or more recording heads in a data storage mechanism (e.g., tape drive, disk drive, and/or the like) that is designed to address the aforementioned deficiencies of existing rotary actuators. Broadly, the disclosed rotary actuator includes first and second distinct cylindrical subassemblies separated by an air gap that create a narrowly and symmetrically distributed mass (e.g., the mass of one of the subassemblies) that is rotatable about a rotation axis passing through the first and second subassemblies. One of the subassemblies includes a magnetically conductive core having an electrically conductive coil wrapped over inner and outer surfaces thereof. In one arrangement, the coil may include first and second winding portions, where the first and second portions are appropriately wrapped and/or electrically connected in a manner that results in opposing current flow directions through the first and second portions, respectively. For instance, the windings of the first portion may be successively wrapped over the inner and outer surfaces of the cylindrical core in a first winding direction in a first direction about a central axis of the core and the windings of the second portion may be successively wrapped over the inner and outer surfaces of the cylindrical core in an opposed second winding direction in the first direction about the central axis. As another example, the first and second coil portions may be wound in a common direction about the central axis of the core and the end of one of the first and second portions connects to an opposite end of the other of the first and second portions.

The other of the subassemblies includes a magnetically conductive core and at least one magnet secured thereto (e.g., such as a cylindrical or washer-shaped magnet rigidly secured to a side or inside of the magnetically conductive core). Transmission of an electric current through the electrically conductive coil induces rotation of one of the subassemblies relative to the other of the subassemblies to rotate the one or more recording heads about an axis that is perpendicular to recording media on the recording head. The narrowly and symmetrically distributed mass of the rotatable subassembly reduces the inertia of the rotatable subassembly, decreases the likelihood of performance-limiting out of plane resonances, and increases the dynamic stability of the actuator. Furthermore, the opposed current flow directions along the magnetically conductive core of the first and second portions of the electrically conductive coil cancels out the magnetic fluxes generated by the first and second coil portions and thus reduces the inductance of the actuator while allowing for improved current rise times. The aforementioned attributes of the disclosed rotary actuator allow for rapid and accurate recording head positioning changes.

The disclosed rotary actuator may form part of a head positioning assembly for a data storage drive or the like, where the head positioning assembly includes at least one recording head configured to read data from and/or write data to storage media, a first travel carriage configured to linearly move the at least one recording head in a lateral direction relative to the storage media, and a rotary actuator that rotates the at least one recording head about an axis that is perpendicular to the storage media. For instance, the rotary actuator may include a first subassembly including a first magnetically conductive cylindrical core having an inner surface and an outer surface and an electrically conductive coil having a plurality of windings wrapped over the inner and outer surfaces of the cylindrical core, and a second subassembly including a second magnetically conductive cylindrical core and at least one magnet rigidly connected to the second magnetically conductive cylindrical core. One of the first and second subassemblies may be non-movable relative to the first travel carriage, the other of the first and second subassemblies may be non-movable relative to the at least one recording head, and the second subassembly is spaced from the first subassembly by an air gap. Transmission of an electric current through the electrically conductive coil induces rotation of the other of the first and second subassemblies and the at least one recording head about the axis that is perpendicular to the storage media.

Any of the embodiments, arrangements, or the like discussed herein may be used (either alone or in combination with other embodiments, arrangements, or the like) with any of the disclosed aspects. Merely introducing a feature in accordance with commonly accepted antecedent basis practice does not limit the corresponding feature to the singular. Any failure to use phrases such as "at least one" does not limit the corresponding feature to the singular. Use of the phrase "at least generally," "at least partially," "substantially" or the like in relation to a particular feature encompasses the corresponding characteristic and insubstantial variations thereof. Furthermore, a reference of a feature in conjunction with the phrase "in one embodiment" does not limit the use of the feature to a single embodiment.

In addition to the exemplary aspects and embodiments described above, further aspects and embodiments will become apparent by reference to the drawings and by study of the following descriptions.

BRIEF DESCRIPTION OF THE DRAWINGS

FIG. 6b is a side view of the rotary actuator of FIG. 6a.

FIG. 6c is a plan view of the rotary actuator of FIG. 6a.

FIG. 8b is a plan view of the rotary actuator of FIG. 8a.

FIG. 9b is a plan view of the rotary actuator of FIG. 9a.

FIG. 10a is a perspective view of the rotary actuator according to another embodiment.

FIG. 10b is a side view of the rotary actuator of FIG. 10a.

FIG. 11b is a plan view of the rotary actuator of FIG. 11a.

DETAILED DESCRIPTION

Disclosed herein is a rotary actuator for positioning a recording head in a data storage mechanism and that includes first and second cylindrical subassemblies separated by an air gap. One of the subassemblies includes a cylindrical magnetically conductive core and an electrically conductive coil having a plurality of successive wraps disposed about inner and outer surfaces of the core. The other of the subassemblies includes a cylindrical magnetically conductive core and at least one magnet secured thereto. One of the subassemblies is configured to be non-rotatable relative to the recording head (e.g., via a series of linkages that rigidly interconnect the one of the subassemblies to the recording head) and rotatable relative to the other of the subassemblies. Transmission of an electric current through the electrically conductive coil induces rotation of the one of the subassemblies relative to the other of the subassemblies to rotate the recording head about an axis that is perpendicular to recording media (e.g., tape, disk) on the recording head. The disclosed rotary actuator facilitates quick and accurate recording head position changes due to low inertia of the rotating subassembly as well as reduced inductance and symmetrical mass distribution of the actuator.

Figure 1:
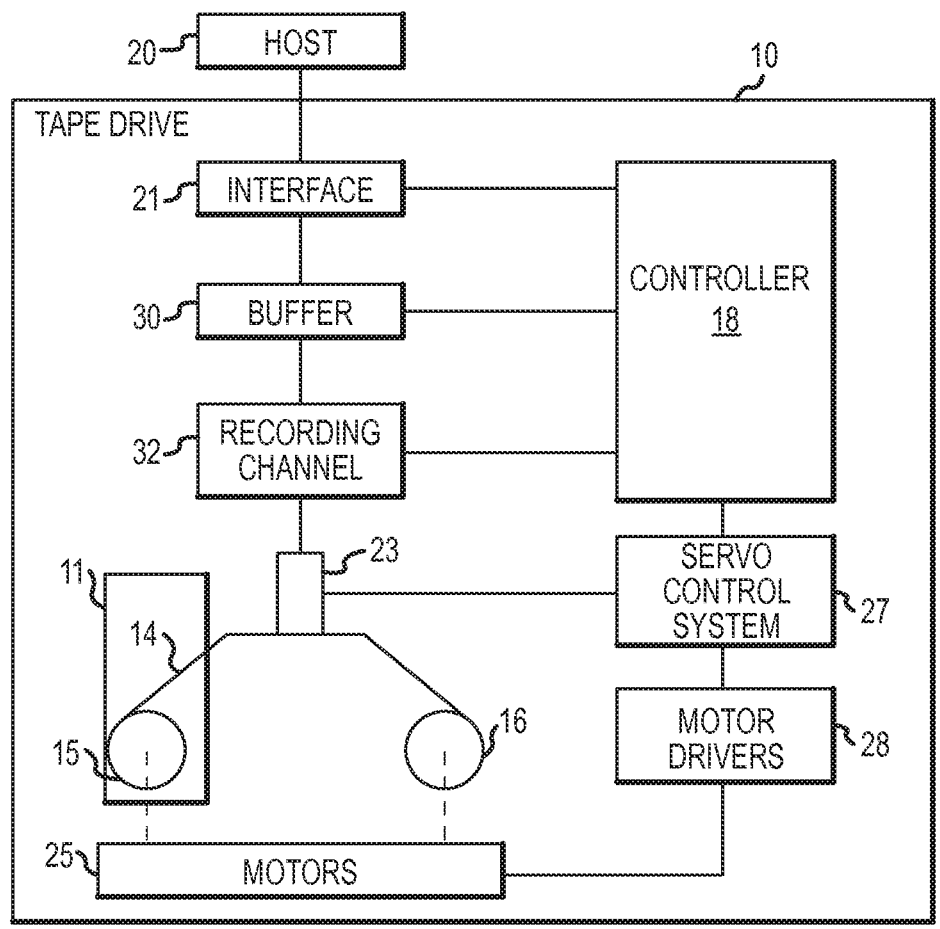
FIG. 1 is a schematic diagram of a tape drive that may incorporate a rotary actuator for angularly or rotatably positioning a tape head relative to recording media as disclosed herein.

Before discussing the rotary actuator presented herein in more detail, it may be useful to disclose one representative environment in which the disclosed actuator may be implemented (while it is to be understood, however, that numerous other such contexts are envisioned and encompassed herein). In this regard, FIG. 1 presents a schematic view of an exemplary tape drive 10 within which the disclosed rotary actuator may be implemented to angularly adjust one or more recording heads relative to magnetic tape media. For instance, the tape drive 10 may receive a magnetic tape cartridge 11 that includes a length of magnetic tape 14 (e.g., magnetic tape pack, magnetic tape media) wound on at least one reel 15. The tape drive 10 may include one or more controllers 18 of a recording system for operating the tape drive 10 in accordance with commands received from a host system 20 received at an interface 21. The tape drive 10 may be coupled to the host system 20 in a number of manners such as directly, through a library, or over a network (e.g., via Small Computer Systems Interface (SCSI), Fibre Channel Interface, and the like). The tape drive 10 may be a standalone unit or form part of a tape library or other subsystem.

The magnetic tape cartridge 11 may be inserted into the tape drive 10 and loaded by the tape drive 10 so that the tape 14 winds around a reel 16 of the tape drive 10 (e.g., in addition to one or more rollers or the like) and so that at least one HPA 23 (e.g., tape head assembly) of the recording system reads and/or writes information with respect to the magnetic tape 14 as the tape 14 is moved longitudinally in first/forward and/or second/reverse opposed directions by one or more motors 25 past the head positioning assembly 23. For instance, the head positioning assembly 23 may include one or more heads, where each head includes a series of servo, read, and/or write elements (e.g., transducers). The recording system may include a servo control or tracking system 27 to electronically switch from one heads to another heads, to seek and move the heads laterally relative to the tape 14, to position the heads at a desired location over the tape 14 and/or one or more tracks of the tape 14, to follow one or more desired tracks, and/or the like. The various components of the tape drive 10 may be incorporated or otherwise embodied within any appropriate housing (not shown). The servo control system 27 may also control the operation of the motors 25 through motor drivers 28 in response to instructions by the one or more controllers 18, where the controllers 18 may provide the data flow and formatting of data to be read from and written to the magnetic tape 14 (e.g., via employing a buffer 30 and a recording channel 32).

Figure 2:
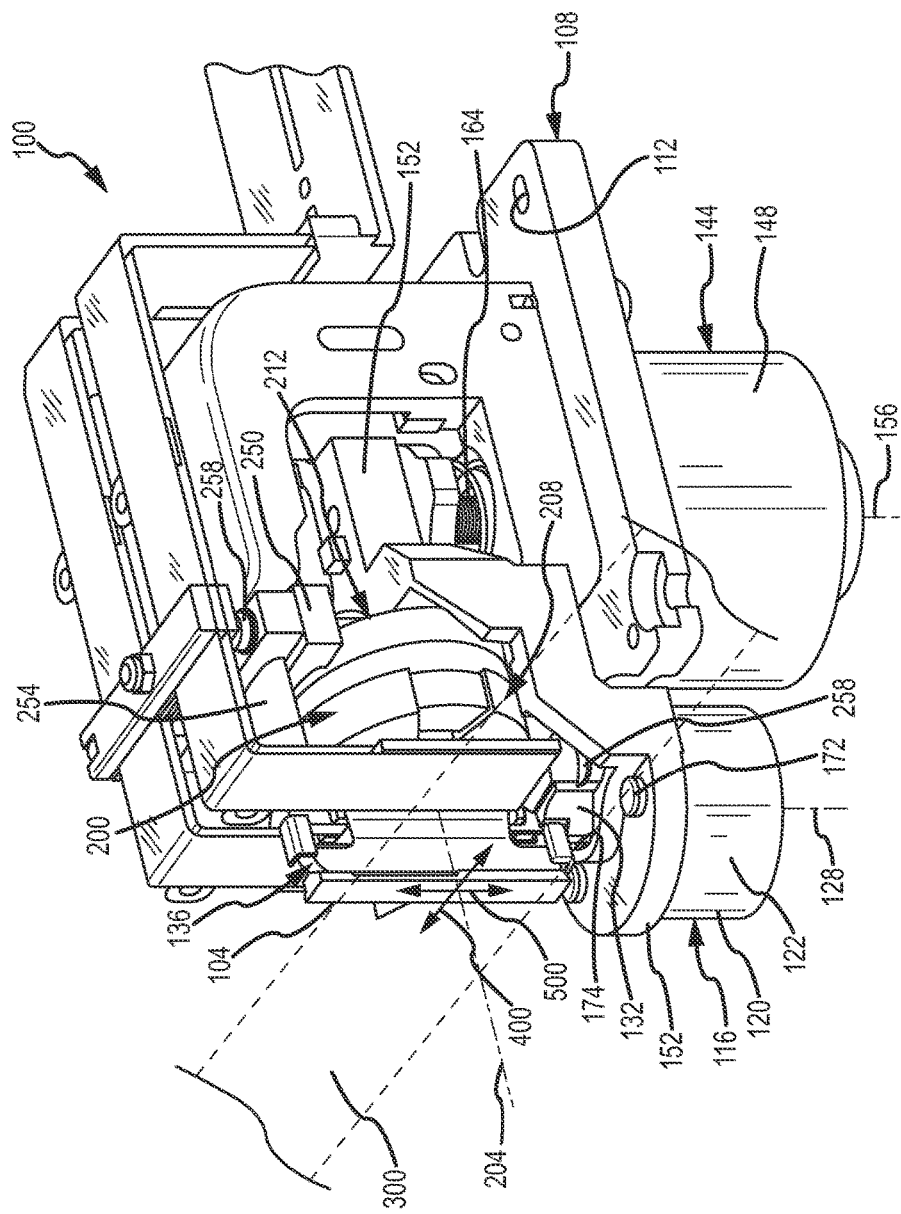
FIG. 2 is a perspective view of a head positioning assembly (HPA) that incorporates a rotary actuator for angularly or rotatably positioning a tape head relative to recording media according to one embodiment.

Turning now to FIG. 2, a perspective view of an HPA 100 (e.g., which may be implemented as the HPA 23 of FIG. 1) is illustrated that incorporates a rotary actuator 200 for angularly (rotatably) positioning a tape head 104 relative to a length of magnetic tape 300 according to one embodiment presented herein. While not shown, the head 104 may include a plurality of read, write, and/or servo elements (e.g., transducers) configured to appropriately read data from and/or write data to a length of magnetic tape 300 moving in one of first and second opposing directions along a path 400 in front of the head 104. The HPA 100 may generally include a housing 108 of any appropriate size and shape to which one or more components of the HPA 100 may be secured and which may be used to secure the HPA 100 to a data storage device (e.g., tape drive 10) and/or the like. As just one example, the housing 108 may include one or more apertures 112 therethrough into which any appropriate fasteners (e.g., bolts, not shown) may be inserted to secure the housing 108 (and thus the HPA 100) to a data storage device and/or the like. The HPA 100 may also include a number of positioning subsystems operable to move or otherwise manipulate the head 104 into any appropriate position(s), such as to allow the read/write/servo elements to more accurately follow data and/or servo tracks or the like.

One positioning subsystem may be a fine linear travel subsystem 116 that is configured to move the head 104 in first and second opposing directions along a path 500 that is generally in a lateral direction of the tape 300 (e.g., substantially perpendicular to the path 400). In one embodiment, the fine travel subsystem 116 may include a fine linear motor 120 that is operable to move a carrier member 124 within a housing 122 in one of first and second opposing directions along an axis 128 that is substantially parallel to the path 500 over a first (e.g., fine) range of travel. See FIG. 4. As just one example, the fine linear motor 120 may generally be in the form of a floating magnetic motor whereby the motor 120 is configured to move the carrier member 124 within the housing 122 along the axis 128 via generation of magnetic flux paths between the carrier member 124 and an electrically conductive coil (not labeled) of the motor 120 (e.g., via servo control system 27 of FIG. 1). A head carriage 132 to which the head 104 may be appropriately rigidly (e.g., non-movably) secured (e.g., via bracket(s) 136 or the like in any appropriate manner) may be rigidly (e.g., non-movably) secured to the carrier member 124 via a threaded bolt 140 or the like (but not secured to the housing 122). In this regard, movement of the carrier member 124 along the axis 128 correspondingly linearly moves the head 104 along the path 500.

Another positioning subsystem may be a coarse linear travel subsystem 144 that is configured to move the head 104 in the first and second opposing directions along the path 500 over a second (e.g., coarse) range of travel that is greater than the first (e.g. fine) range of travel. In this regard, the coarse travel subsystem 144 may be utilized by the servo control system 27 to generally move the head 104 into a desired area over the tape 300 while the fine travel subsystem 116 may be utilized by the servo control system 27 to "fine tune" the position of the head 104. In one embodiment, the coarse travel subsystem 144 may include a coarse linear motor 148 that is operable to move a coarse travel carriage 152 in one of first and second opposing linear directions along an axis 156 that is substantially parallel to the path 500 over a second (e.g., coarse) range of travel. See FIG. 4.

As just one example, the coarse linear motor 148 may include an internally threaded socket 160 that is configured to rotate in one of first and second opposed rotational directions about axis 156 to correspondingly raise or lower a threaded member 164 along the axis 156. One end 168 of the threaded member 164 may be non-rotatably held relative to the carriage 152 in any appropriate manner (e.g., via rigidly securing the end 168 to the carriage, via a cam, etc.) so that rotation of the socket 160 induces linear movement of the threaded member 164 along the axis 156 in one of first and second opposite directions. In one arrangement, the carriage 152 may be configured to ride along a guiding shaft 170 (e.g., via inserting the guiding shaft 170 through an aperture 171 of the carriage) to guide linear movement of the carriage 152 upon rotation of the socket 160 of the coarse linear motor 148.

As discussed previously, the head carriage 132 (to which the head 104 may be appropriately rigidly secured in any appropriate manner) may be rigidly secured to the carrier member 124 of the fine linear motor 120 via a threaded bolt 140 or the like for use in moving the head 104 along path 500 over a fine linear range. To thus allow the coarse travel subsystem 144 to move the head along the path 500 over a coarse linear range, the housing 122 of the fine linear motor 120 (within which the carrier member 124 may float) may be rigidly secured to the carriage member 152 in any appropriate manner (e.g., via fasteners 172 as shown in FIGS. 2 and 3). In this regard, the coarse travel subsystem 144 may move the head 104 along the path 500 over a coarse linear range while the fine travel subsystem 116 may (e.g., simultaneously or non-simultaneously) move the head 104 along the path 500 over a fine linear range.

Figure 3:
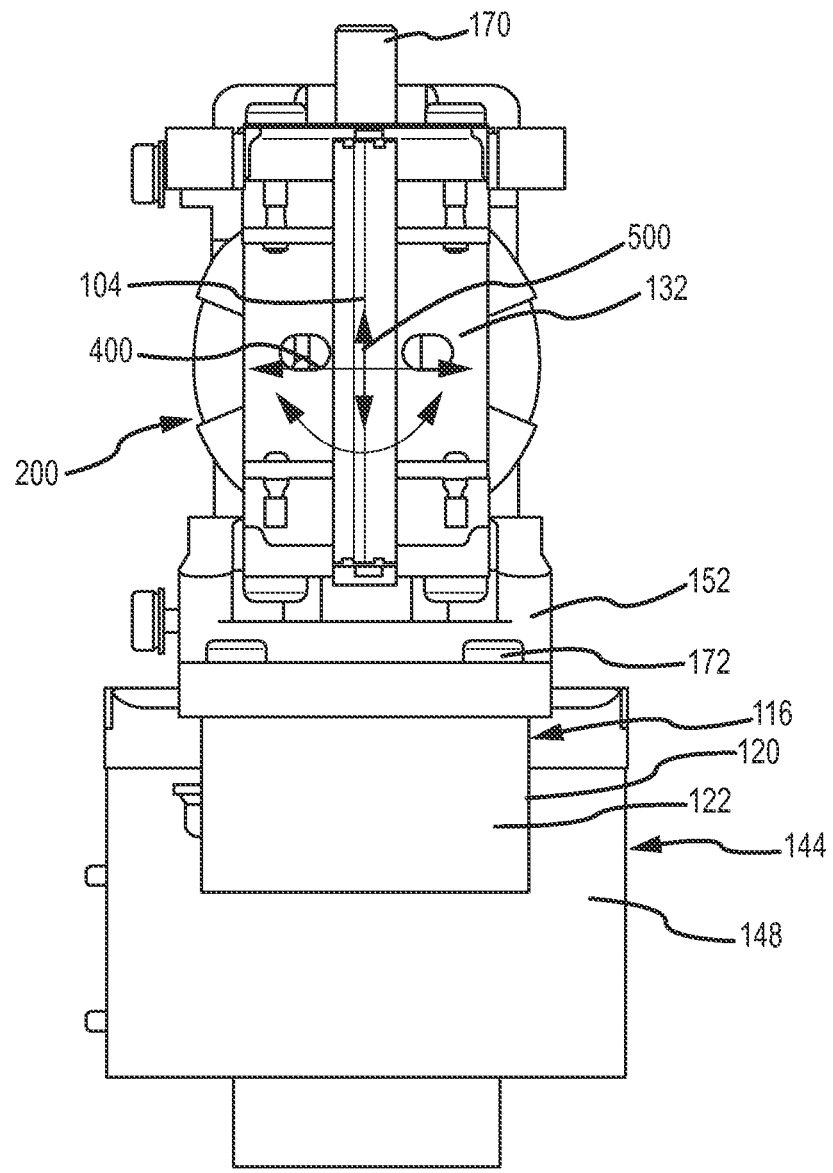
FIG. 3 is a front view of the HPA of FIG. 2.

Another positioning subsystem of the HPA 100 may be an angular or rotary travel subsystem in the form of the rotary actuator 200 for angularly or rotatably positioning the head 104 about an axis 204 that is substantially perpendicular to the path 500 of the head 104, the path 400 of the tape 300, and the reading/recording surface of the tape 300. See FIGS. 2-5. The angular head motion (illustrated by curved arrows in FIG. 3) allows the servo readers and/or the read/write elements of the head 104 to be aligned correctly (e.g., via the servo control system 27) to the tape 300 during track following and/or during read/write operations.

Figure 5:
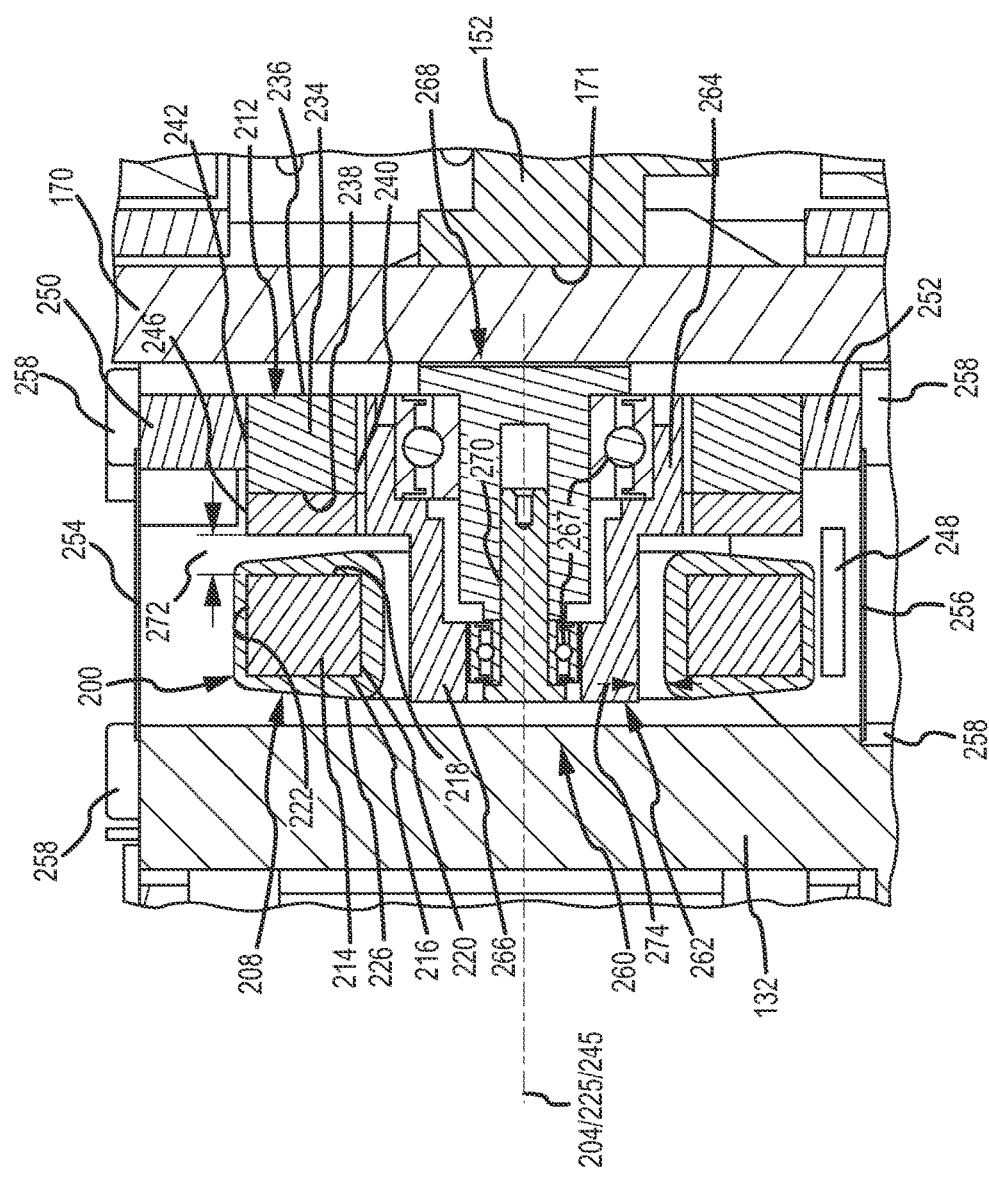
FIG. 5 is a close-up of the section view of FIG. 4.
Figure 6B:
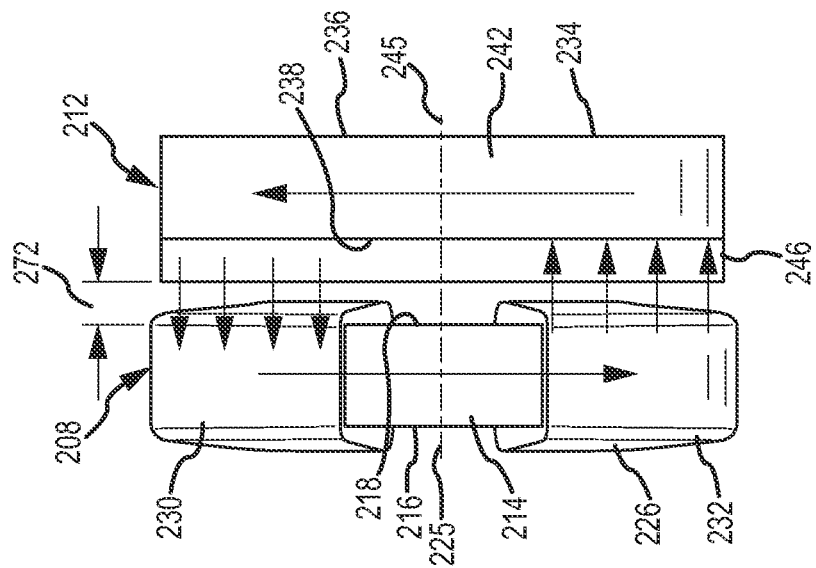
Figure 6A:
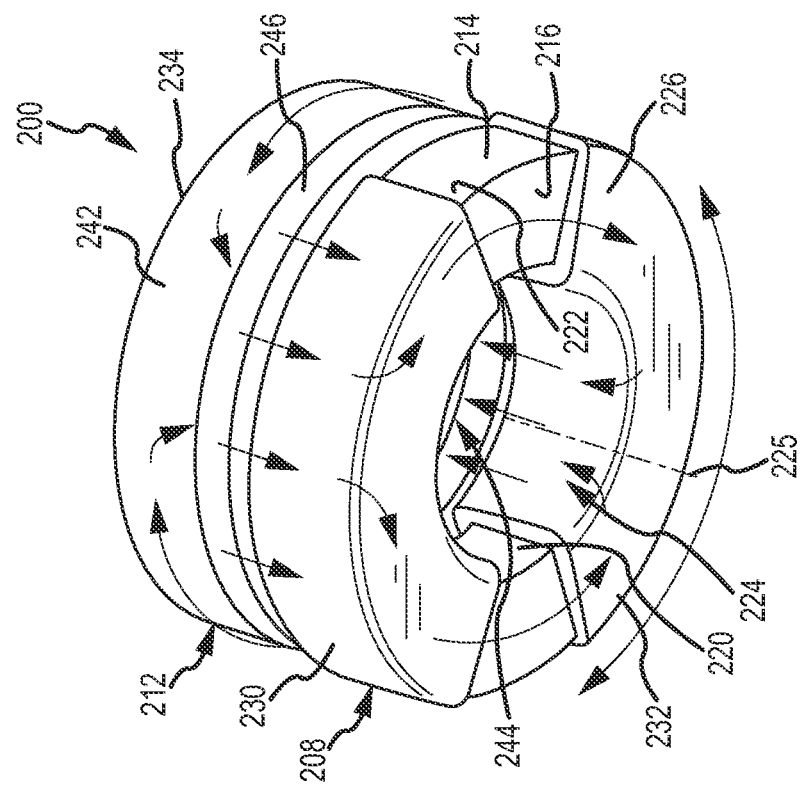
FIG. 6a is a perspective view of the rotary actuator of FIG. 2.

Broadly, the rotary actuator 200 includes first and second subassemblies 208, 212, one of which is rotatable relative to the other about axis 204 via the interaction between the coil current and the permanent magnet magnetic field upon application of an electric current to the first subassembly 208. As shown in FIGS. 5, 6a and 6b, the first subassembly 208 generally includes a first magnetically conductive cylindrical core 214 (e.g., constructed of steel, soft magnetic material, etc.) having first and second opposing side surfaces 216, 218, inner and outer surfaces 220, 222, a central aperture 224 extending between the first and second opposing side surfaces 216, 218, and a central axis 225 extending through the central aperture 224.

The first subassembly 208 also includes an electrically conductive coil 226 (e.g., constructed of magnet wire) having a plurality of windings 228 (see FIG. 7) wrapped over the inner and outer surfaces 220, 222 and the first and second opposing side surfaces 216, 218 of the cylindrical core 214 (e.g., as opposed to just over the outer surface 222 as is the case with some existing actuators). While not shown, first and second ends of the electrically conducive coil 226 may be respectively electrically interconnected to a servo control system 27 (or other system of the tape drive 10) which is operable to appropriately send an electric current to the electrically conductive coil 226 for operation of the rotary actuator 200 as will be discussed in more detail in the discussion that follows. Broadly, the electrically conductive coil 226 may include at least first and second portions 230, 232 that are appropriately wrapped and/or electrically connected in a manner that results in opposing current flow directions through the first and second portions 230, 232, respectively. The inventors have found that this arrangement advantageously fully or substantially fully cancels out the magnetic fluxes generated by the first and second portions 230, 232 to thus reduce the inductance of the rotary actuator 200 while allowing for decreased (faster) current rise times of the rotary actuator 200.

Figure 7A:
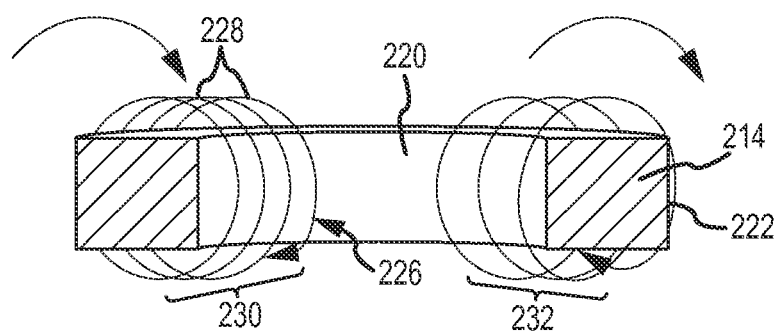
FIG. 7a is a sectional view of a magnetically conductive core and coil of the rotary actuator of FIG. 6a and illustrating one embodiment of achieving opposing current flow directions through first and second portions of the electrically conductive coil.

In one arrangement, the windings 228 of the first portion 230 may be successively wrapped in a first winding direction (e.g., clockwise as shown in FIG. 7a which has been greatly simplified in the interest of clarity, where the first winding direction is depicted by the curved arrow in the upper left portion of FIG. 7a) over the inner and outer surfaces 220, 222 of the conductive core 214 in a first direction through the magnetically conductive core 214 about the central axis 225 (not shown in FIG. 7a, but see FIGS. 6a-6b). In contrast, the windings 228 of the second portion 232 may be successively wrapped in an opposed second winding direction (e.g., counterclockwise as shown in FIG. 7a, where the second winding direction is depicted by the curved arrow in the upper right portion of FIG. 7a) over the inner and outer surfaces 220, 222 of the magnetically conductive core 214 in the first direction through the magnetically conductive core 214 about the central axis 225.

That is, the windings 228 of the first and second portions 230, 232 may be oppositely wrapped from the perspective of travel through the magnetically conductive core 214 in a first direction about the central axis 225, first through the first portion 230 and then continuing in the first direction through the second portion 232. Upon activation of the rotary actuator 200, provision of the aforementioned oppositely wrapped windings advantageously fully or substantially fully cancels out the magnetic fluxes generated by the first and second portions 230, 232 and thus reduces the inductance of the actuator while allowing for decreased current rise times of the actuator.

Figure 7B:
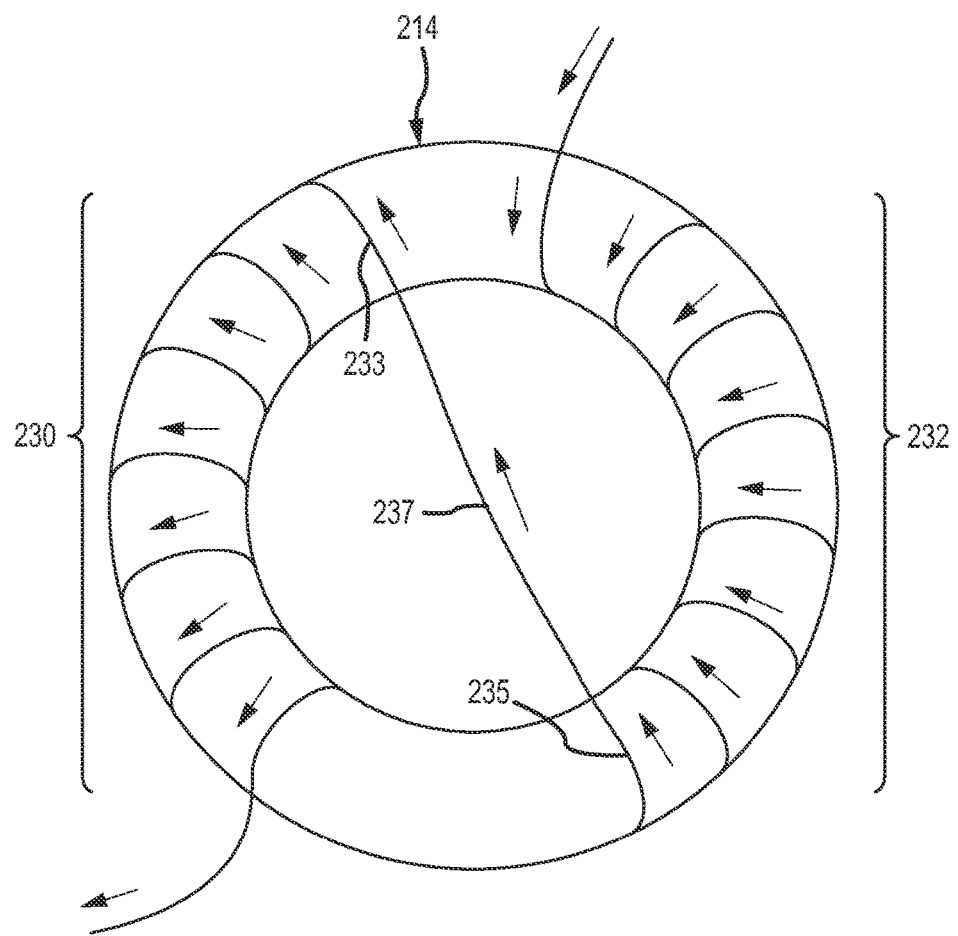
FIG. 7b is a plan view of the magnetically conductive core and coil of the rotary actuator of FIG. 6a illustrating another embodiment of achieving opposing current flow directions through first and second portions of the electrically conductive coil

In another arrangement, and with reference to FIG. 7b, the first and second coil portions 230, 232 may be wound in a common direction about the central axis 225. In this arrangement, however, an end 233 of the first coil portion 230 may be appropriately electrically interconnected to an opposite end 235 of the second portion 232 (e.g., via connection portion 237 of the electrically conductive coil 226). This arrangement results in opposing current flow directions through the first and second coil portions 230, 232 (where the opposing current flow directions are depicted by the arrows in FIG. 7b)

With reference back to FIGS. 5, 6a and 6b, the second subassembly 212 generally includes a second magnetically conductive cylindrical core 234 (e.g., constructed of steel, soft magnetic material, etc.) having first and second opposing side surfaces 236, 238, inner and outer surfaces 240, 242, a central aperture 244 extending between the first and second opposing side surfaces 236, 238, and a central axis 245 extending through the central aperture 244. The second subassembly 212 also includes at least one magnet 246 (e.g., permanent magnet) non-movably secured to (or relative to) the second magnetically conductive core 234 in any appropriate manner (where the at least one magnet 246 has opposing magnetic poles or is otherwise magnetized in opposing first and second directions). For instance, the magnet 246 may be attached to the second side surface 238 via magnetic attraction between the magnet 246 and the second magnetically conductive core 234. Additionally or alternatively, one or more bonding agents (e.g., adhesives, epoxies) may be utilized to rigidly secure the magnet 246 to the second magnetically conductive core 234. In one arrangement, the magnet 246 may be in the form of a cylindrical or washer-shaped (e.g., disk-shaped) member having a central aperture and central axis (not labeled) that generally align with the central aperture 244 and central axis 245 of the second magnetically conductive core 234 (e.g., so that the magnet 246 generally surrounds the central axis 245). See FIGS. 4, 5, 6a and 6b.

While the at least first and second coil portions 230, 232 have been disclosed in conjunction with the at least one magnet 246 being magnetized in opposing first and second directions, other embodiments disclosed herein include additional numbers of coil portions and corresponding magnets being magnetized in opposing directions (e.g., in multiples of two, where the number of coil portions matches the total number of magnetized directions of the magnets). For instance, one embodiment envisions the electrically conductive coil 226 including first, second, third and fourth coil portions and the at least one magnet 246 being in the form of first and second magnets, each of which is magnetized in first and second directions. In this example, the current through the first and third portions may travel in the first current flow direction and current through the second and fourth portions may travel in the second current flow direction. As another example, another embodiment envisions the electrically conductive coil including first, second, third, fourth, fifth and sixth coil portions and the at least one magnet 246 being in the form of first, second, and third magnets, each of which is magnetized in first and second directions. In any case, symmetrically constructing each of the first and second subassemblies 208, 212 about axis 204 as described and shown herein advantageously decreases the likelihood of performance-limiting out of plane resonances that may otherwise occur upon rotation of one of the first and second subassemblies 208, 212 relative to the other of the first and second subassemblies 208, 212 while increasing the dynamic stability of the rotary actuator 200.

One of the first and second subassemblies 208, 212 is non-movable relative to the coarse travel carriage 152 and the other of the first and second subassemblies 208, 212 is non-rotatable (but still at least partially movable) relative to the head 104 and rotatable relative to the coarse travel carriage 152. While the first subassembly 208 is illustrated as being non-movable relative to the coarse travel carriage 152 and the second subassembly 212 is illustrated as being non-rotatable relative to the head 104 and rotatable relative to the coarse travel carriage 152, the arrangement could be reversed whereby the second subassembly 212 is non-movable relative to the coarse travel carriage 152 and the first subassembly 208 is non-rotatable relative to the head 104 and rotatable relative to the coarse travel carriage 152 without departing from the scope and spirit of the disclosure. As one non-limiting example, the first subassembly 208 may be rigidly secured in any appropriate manner (e.g., bonding, clamping, screwing, etc., not shown) to a portion of the coarse travel carriage 152, such as to a tab or platform 248 of the coarse travel carriage 152. See FIGS. 4-5. As another non-limiting example, the second subassembly 212 may be non-rotatably secured to the head 104 by way of at least one rotary (e.g., "azimuth") carriage 250, one or more flexures (e.g., planar leaf springs constructed of sheet steel), and the head carriage 132 as discussed below.

Figure 4:
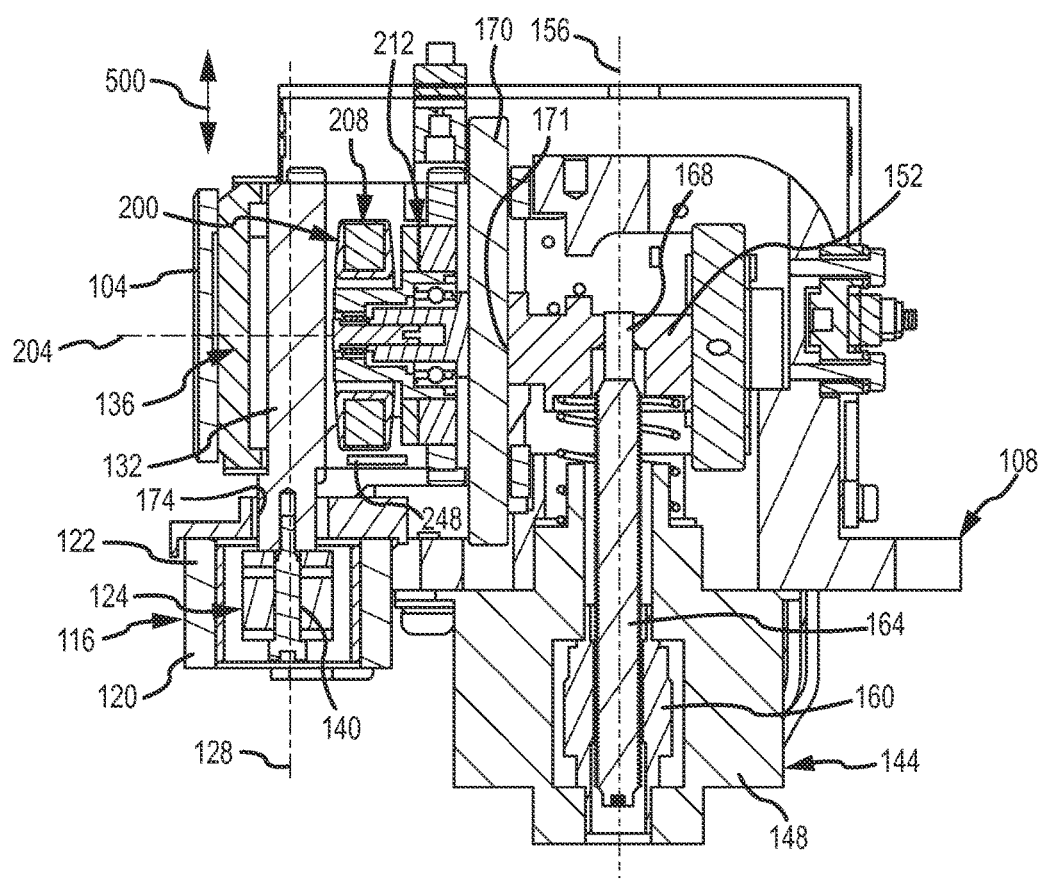
FIG. 4 is a sectional elevation view through the HPA of FIG. 2.

With reference to FIGS. 2, 4 and 5, the at least one rotary carriage may include upper and lower rotary carriage ends or portions 250, 252 respectively rigidly (e.g., non-movably) secured to opposing portions (e.g., separated by 180°) of the outer surface 242 of the second conductive core 234 in any appropriate manner (e.g., bonding, clamping, screwing, etc., not shown). Stated differently, the second magnetically conductive core 234 may be rigidly secured between the upper and lower rotary carriage portions 250, 252. First and second flexures 254, 256 may be respectively non-rotatably connected between the upper and lower rotary carriage portions 250, 252 and first and second (e.g., upper and lower) portions of the head carriage 132 in any appropriate manner, such as via fasteners 258 extending through the first and second flexures 254, 256 and into the upper and lower rotary carriage portions 250, 252 and the head carriage 132 (and/or in other manners such as via bonding, clamping, screwing, etc.).

As shown in FIGS. 2 and 4, a portion of the head carriage 132 may freely pass through and/or otherwise float within an enlarged aperture 174 of the coarse travel carriage 152. Stated differently, the portion of the head carriage 132 (e.g., and/or fastener 140 in the event that fastener 140 connected to head carriage 132 at a location above and outside of aperture 174, see FIG. 4) passing through or at least into the aperture 174 may have an outer diameter less than an inner diameter of the aperture 174. This arrangement advantageously allows the portion of the head carriage 132 to at least slightly or partially rotate about axis 204) within the aperture 174. As a result, any rotation of the second subassembly 212 induces corresponding rotation of the head 104 through the upper and lower rotary carriage portions 250, 252, the first and second flexures 254, 256, and the head carriage 132 (e.g., and bracket(s) 136, if included). While the head carriage 132 and head 104 are non-rotatable (e.g., about axis 204) relative to the second subassembly 212 (e.g., such that rotation of the second subassembly 212 induces corresponding rotation of the head carriage 132 and head 104) via the first and second flexures 254, 256, the first and second flexures 254, 256 may still flex to allow the head carriage 132 to linearly move along axis 128 which induces corresponding linear movement of the head 104 along path 500 (which may or may not occur simultaneously with rotary/angular adjustment of head 104 about axis 204).

As discussed above, the subassembly that is non-rotatable relative to the head 104 (in this example, the second subassembly 212) is at the same time rotatable relative to the coarse travel carriage 152. In one embodiment and with reference now to FIGS. 4-5, a shaft subassembly 260 may be utilized to rotatably (e.g., about axes 204/225/245) secure the second subassembly 212 to (or relative to) the coarse travel carriage 152. For instance, the shaft subassembly 260 may include a first (e.g., cylindrical) portion 262 having a head 264 that is non-movably (e.g., rigidly) secured to the inner surface 240 of the second magnetically conductive core 234 (e.g., and to the inner surface of the magnet 246) within the central aperture 244 of the second magnetically conductive core 234 in any appropriate manner (e.g., bonding, clamping, screwing, etc.) and a body 266 extending away from the head 264. In one embodiment, the body 266 may freely pass through or into the central aperture 224 of the first magnetically conductive core 214 such that the body 266 does not contact the first subassembly 208.

The shaft subassembly 260 may also include a second portion 268 non-movably (e.g., rigidly) connected to the coarse travel carriage 152 and about which the first portion 262 may be rotatable via a bearing subassembly made up of a number of bearings 267 (e.g., each including inner and outer races, balls, etc.) appropriately disposed between the first and second portions 262, 268. While the second portion 268 of the shaft subassembly 260 may be one-piece with the rest of the coarse travel carriage 152 as shown in FIGS. 4-5, other embodiments envision that the second portion 268 may be a separate member that is appropriately rigidly (e.g., non-movably) secured to the coarse travel carriage 152. In one arrangement, a fastener 270 (e.g., threaded fastener) may be inserted through a central aperture of one of the bearings 267 and threaded into a threaded central aperture of the second portion 268 of shaft subassembly 260 as shown in FIGS. 4-5 to rotatably secure the first portion 262 to the second portion 268. In this regard, the inner races of the bearings 267, the fastener 270 and the second portion 268 may be rigidly (e.g., non-movably) connected to (or relative to) each other while the outer races of the bearings 267 and the first portion 262 may all be rigidly (e.g., non-movably) connected to each other. The balls of the ball bearings 267 thus facilitate relative rotation between the inner races of the bearings 267, the fastener 270 and the second portion 268 on the one hand and the outer races of the bearings 267 and the first portion 262 on the other hand. While one manner of rotatably securing the second subassembly 212 of the rotary actuator 200 to (or relative to) the coarse travel carriage 152 has been discussed, it is to be understood that other manners of doing so are envisioned and encompassed in the present disclosure.

Once the first subassembly 208 has been non-movably (rigidly) secured to (or relative to) the coarse travel carriage 152 and the second subassembly 212 has been non-rotatably secured relative to the head 104 and rotatably secured to (or relative to) the coarse travel carriage 152, a number of observations may be made. One observation is that a gap (e.g., air gap) 272 is disposed between the sides of the first and second subassemblies 208, 212 (e.g., where the gap 272 extends in a direction that is generally perpendicular to the axis 204 between the magnet 246 and the magnetically conductive core 234) to allow for a magnetic flux generated by the second subassembly 212 (e.g., the permanent magnet 246) to travel back and forth between the first and second subassemblies 208, 212 for purposes of inducing rotation of the second subassembly 212 about axis 204. The gap 272 also allows the second subassembly 212 to rotate about the axis 204 in a manner that is free from hindrance by the first subassembly 208. In one arrangement, the second subassembly 212 may be rotatably secured to the coarse travel carriage 152 and then the first subassembly 208 may be disposed over the body 266 and rigidly secured to the coarse travel carriage 152 at a position so that the gap 272 is disposed between the first and second subassemblies 208, 212. As shown, another gap 274 may be disposed between the body 266 and the first subassembly 208 to allow for free rotation of the body 266 (and thus the second subassembly 212) relative to the first subassembly 208.

Another observation is that the central axes 225, 245 of the first and second subassemblies 208, 212 as well as the rotation axis 204 are collinear or substantially collinear. A further observation is that the first and second subassemblies 208, 212 are non-concentric. Stated differently, no part of one of the first and second subassemblies 208, 212 may be disposed within a portion of the other of the first and second subassemblies 208, 212 in the embodiment shown in FIGS. 2-7. This arrangement may be advantageous in the context of certain size or shape considerations of a data storage device (e.g., the tape drive 10) or the like (e.g., medical devices).

One manner of operating the rotary actuator 200 to angularly or rotatably adjust the head 104 about axis 204 will now be described. For instance, the servo control system 27 of the tape drive 10 of FIG. 1 may determine in any appropriate manner (e.g., via reading servo tracks of the tape 300) that the angular position of head 104 about axis 204 relative to the tape 300 needs to be adjusted so as to more accurately follow one or more data tracks on the tape 300 or the like. In response, the servo control system 27 may generate one or more control signals to pass an electric current of any appropriate magnitude to the electrically conductive coil 226 of the first subassembly 208 via one or more conductive lines, leads and/or the like (not shown). As shown in FIGS. 6a-6b, it can be seen how the at least one permanent magnet 246 creates a number of magnetic flux paths (as represented by arrows in FIGS. 6a-6b) that successively pass through the first portion 230 of the electrically conductive coil 226, the first magnetically conductive core 214, the second portion 232 of the electrically conductive coil 226, the gap 272, the at least one magnet 246, the second magnetically conductive core 234, the at least one magnet 246, the gap 272, and then the first portion 230 of the electrically conductive coil 226 to begin the paths again.

The interaction between the aforementioned magnetic flux and current in the electrically conductive coil 226 induces rotation of the second subassembly 212 about axis 204 relative to the first subassembly 208 and the coarse travel carriage 152 (e.g., by way of a Lorentz force described as F=qv×B where q is the charge in the coil, v is the velocity of the charge, and B is the magnetic field in which the coil is located). As discussed herein, rotation of the second subassembly 212 about axis 204 induces corresponding rotation of the head 104 via the upper and lower rotary carriage portions 250, 252, the first and second flexures 254, 256, and the head carriage 132 (e.g., and bracket(s) 136, if included). It will be appreciated how one or more characteristics of the electric current transmitted through the electrically conductive coil 226 may be manipulated or otherwise changed to obtain a desired rotation of the second subassembly 212 and thus of the head 104 such as magnitude, voltage, direction, and/or the like. Simultaneously or non-simultaneously with rotation of the second subassembly 212, the fine and/or coarse travel subsystems 116, 144 may be operated to linearly move the head 104 in first or second opposing directions along path 500.

The disclosed rotary actuator 200 includes a number of advantages over existing or conventional rotary actuators. In one regard, the narrowly and symmetrically distributed mass of the rotatable subassembly (e.g., as shown in the figures, the second subassembly 212, although the first subassembly 208 could be rotatable and the second subassembly 212 non-rotatable and non-movable relative to the coarse travel carriage 152) reduces the inertia of the rotatable subassembly, decreases the likelihood of performance-limiting out of plane resonances, and increases the dynamic stability of the rotary actuator 200. Furthermore, the opposed current flow directions of the first and second portions 230, 232 of the electrically conductive coil 226 substantially cancel out the magnetic fluxes generated by the first and second portions 230, 232 thus reducing the inductance of the rotary actuator 200 while allowing for fast current rise times of the rotary actuator 200 (and thus more rapid rotary or angular positioning adjustments of the head 104). The aforementioned attributes of the rotary actuator 200 allow for rapid and accurate recording head positioning changes.

Figure 8B:
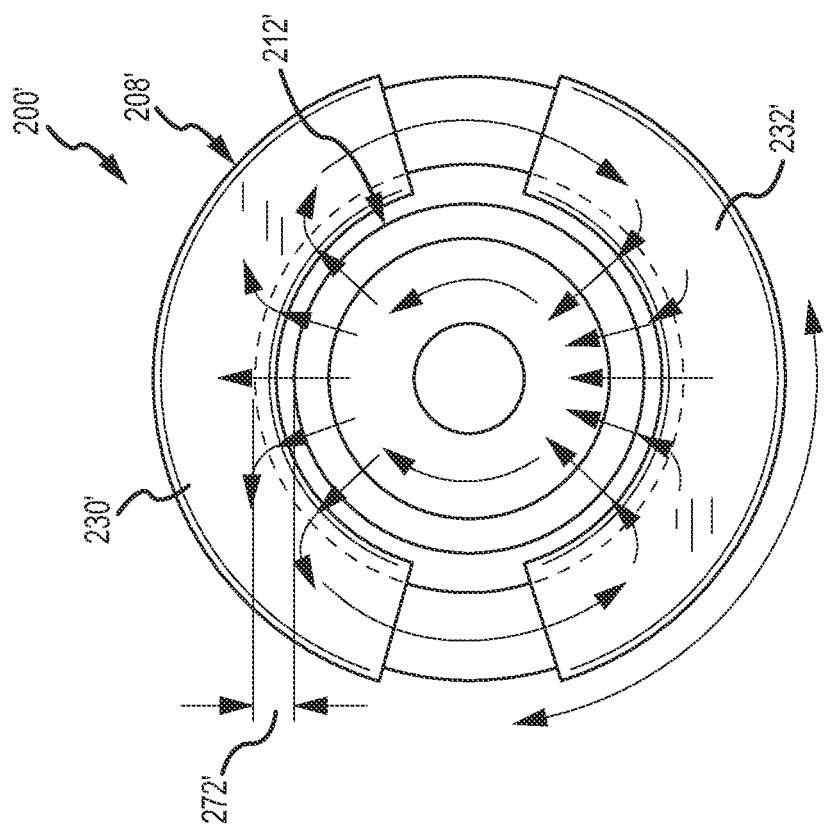
Figure 8A:
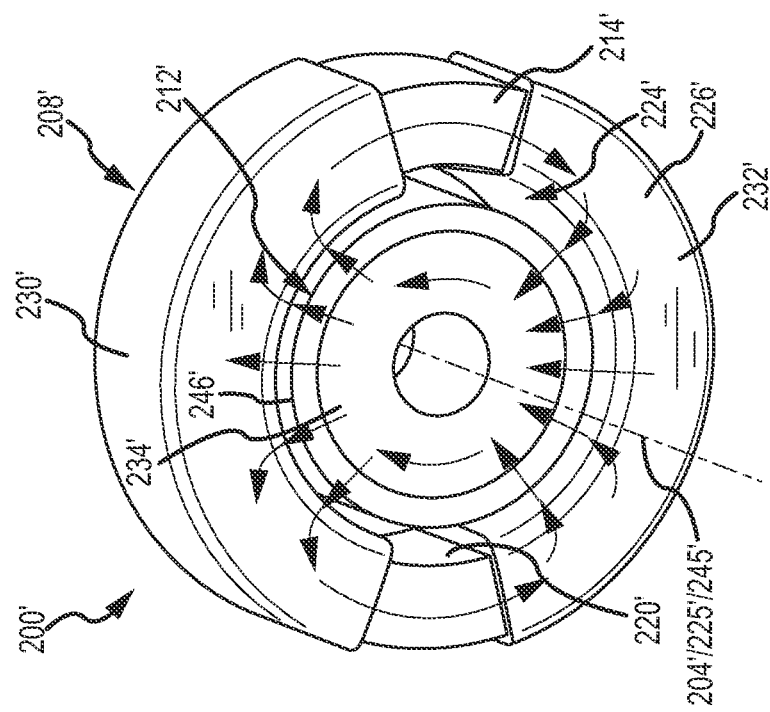
FIG. 8a is a perspective view of the rotary actuator according to another embodiment.

FIGS. 8a-8b illustrate another embodiment of the rotary actuator 200' in which the second subassembly 212' is concentrically arranged or disposed within the central aperture 224' of the first subassembly 208'. In this embodiment, the at least one magnet 246' of the second subassembly may be rigidly secured to the outer surface 242' (not labeled in FIGS. 8a-8b) of the second magnetically conducive core 234' such that the gap 272' is defined between the outer surface of the at least one magnet 246' and the inner surface of the first subassembly 208' (e.g., the inner surface 220 of the first magnetically conductive core 214'). While not shown, one of the first and second subassemblies 208', 212' may be non-movable relative to the coarse travel carriage 152 and the other of the first and second subassemblies 208', 212' may be non-rotatable relative to the head 104 and rotatable relative to the coarse travel carriage 152 in any appropriate manner.

Figure 9B:
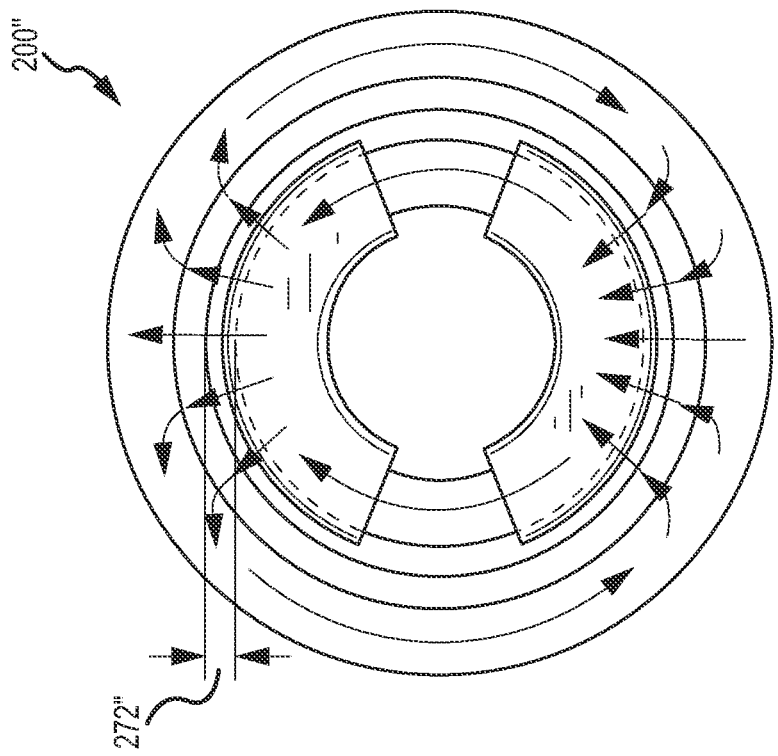
Figure 9A:
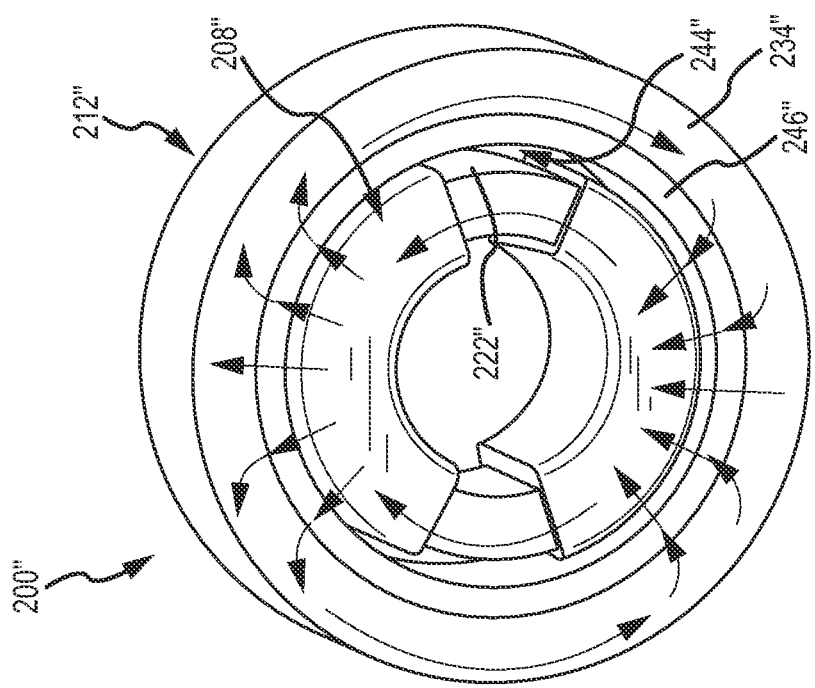
FIG. 9a is a perspective view of the rotary actuator according to another embodiment.

The at least one permanent magnet 246' generates a number of magnetic flux paths (as represented by arrows in FIGS. 8a-8b) that successively pass through the first portion 230' of the electrically conductive coil 226', the first magnetically conductive core 214', the second portion 232' of the electrically conductive coil 226', the gap 272', the at least one magnet 246', the second magnetically conductive core 234', the at least one magnet 246', the gap 272', and then the first portion 230' of the electrically conductive coil 226' to begin the paths again. Current through the coil induces rotation of one of the first and second subassemblies 208', 212' to induce corresponding rotation of the head 104. FIGS. 9a-9b illustrate another embodiment of the rotary actuator 200" similar to the rotary actuator 200' of FIGS. 8a-8b, but where the first subassembly 208" is concentrically arranged within the central aperture 244" of the second subassembly 212". In this embodiment, the at least one magnet is rigidly secured to the inner surface 240" (not labeled) of the second magnetically conductive core 234" so as to face the outer surface of the first subassembly 208" (e.g., the outer surface 222" of the first magnetically conductive core 214") and be separated therefrom by gap 272".

Figure 6C:
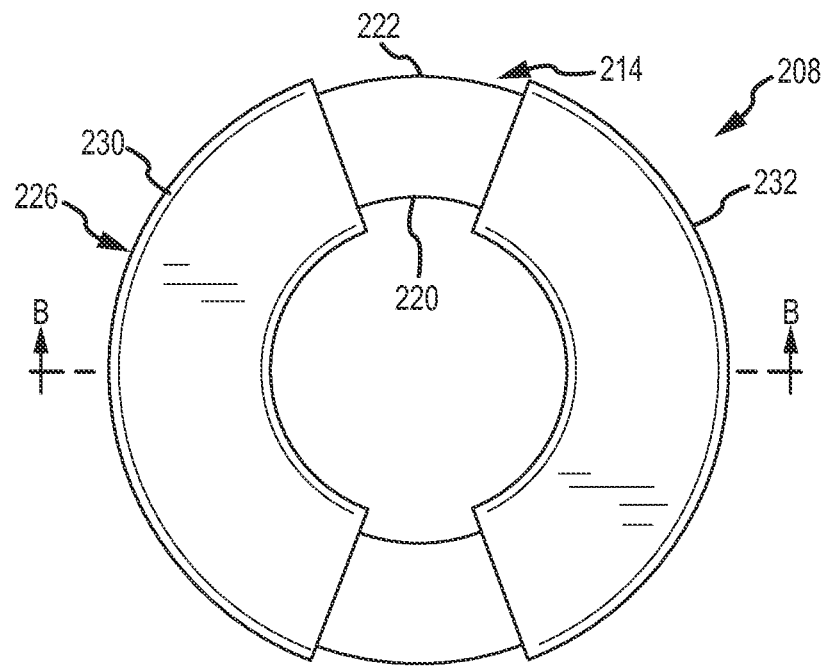

FIGS. 10a-10b illustrate another embodiment of the rotary actuator 200''' similar to the rotary actuator 200 of FIGS. 6a-6c but that includes a third subassembly 213''' similar to the second subassembly 212''' and non-concentrically disposed on an opposite side of the first subassembly 208''' from the second subassembly 212'''. In this embodiment, the at least one magnet 247''' of the third subassembly 213''' may face one side of the first subassembly 208''' and be spaced therefrom by a gap 273''', and the at least one magnet 246''' of the second subassembly 212''' may face the other side of the first subassembly 208''' and be spaced therefrom by the gap 272'''. While not shown, one of a) the first subassembly 208''' and b) the second and third subassemblies 212''', 213''' may be non-movable relative to the coarse travel carriage 152 and the other of a) the first subassembly 208''' and b) the second and third subassemblies 212''', 213''' may be non-rotatable relative to the head 104 and rotatable relative to the coarse travel carriage 152 in any appropriate manner. The at least two permanent magnets 246''', 247''' generate a number of magnetic flux paths (as represented by arrows in FIGS. 10a-10b) that induce rotation of one a) the first subassembly 208''' and b) the second and third subassemblies 212''', 213''' to induce corresponding rotation of the head 104 when current is run through the coil 226'''.

Figure 11B:
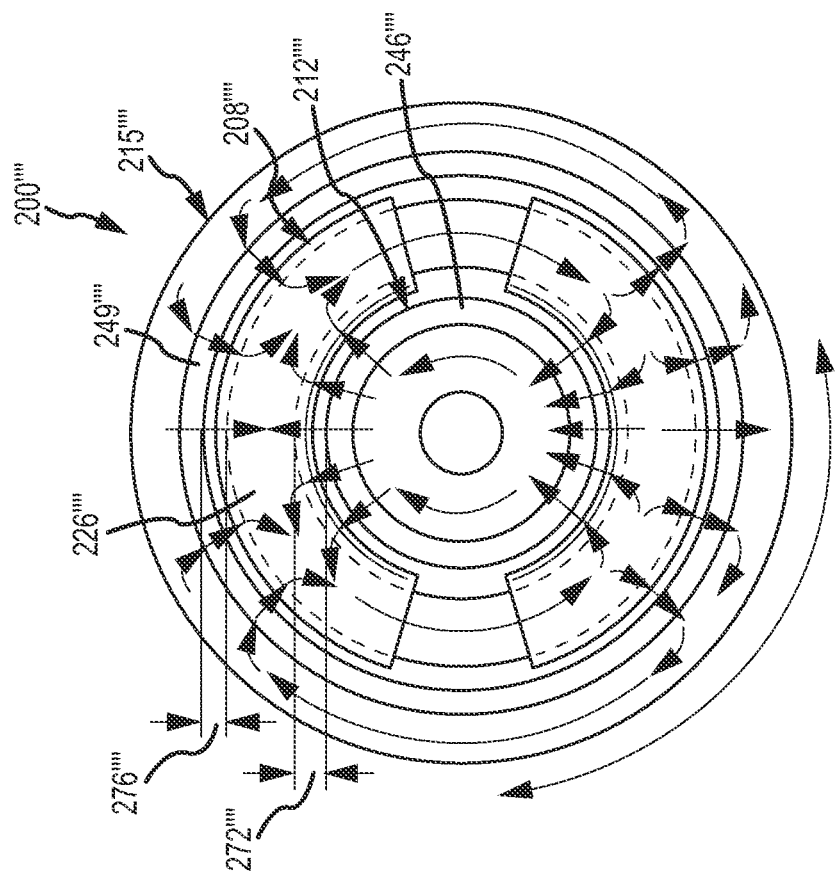
Figure 11A:
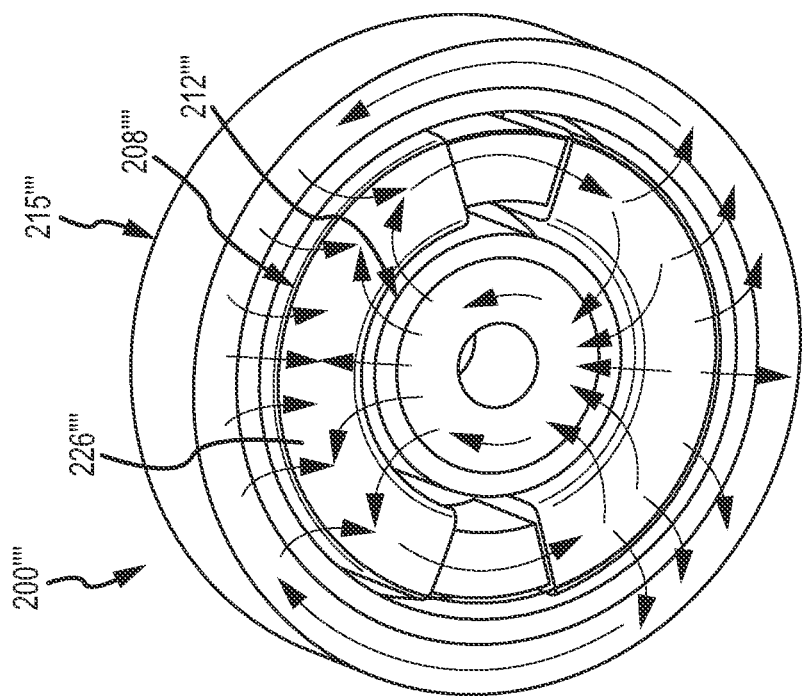
FIG. 11a is a perspective view of the rotary actuator according to another embodiment.

FIGS. 11a-11b illustrate another embodiment of the rotary actuator 200'''' similar to the rotary actuator 200' of FIGS. 8a-8b, but that includes a third subassembly 215'''' similar to the second subassembly 212'''' within which the first and second subassemblies 208'''', 212'''' are concentrically disposed. In this embodiment, the at least one magnet 249'''' of the third subassembly 215'''' may face the outer surface of the first subassembly 208'''' and be spaced therefrom by a gap 276'''', and the at least one magnet 246'''' of the second subassembly 212''' may face the inner surface of the first subassembly 208'''' and be spaced therefrom by the gap 272''''. While not shown, one of a) the first subassembly 208'''' and b) the second and third subassemblies 212'''', 215'''' may be non-movable relative to the coarse travel carriage 152 and the other of a) the first subassembly 208'''' and b) the second and third subassemblies 212'''', 215'''' may be non-rotatable relative to the head 104 and rotatable relative to the coarse travel carriage 152 in any appropriate manner. The at least two permanent magnets 246'''', 249'''' generatea number of magnetic flux paths (as represented by arrows in FIGS. 11a-11b) that induce rotation of one a) the first subassembly 208'''' and b) the second and third subassemblies 212''', 215'''' to induce corresponding rotation of the head 104 when current is run through the coil 226''''.

It will be readily appreciated that many additions and/or deviations may be made from the specific embodiments disclosed in the specification without departing from the spirit and scope of the invention. For instance, it is to be understood that the disclosed rotary actuator may be used in other contexts (i.e., other than tape drive or storage mechanism contexts) in which rotary or angular control of a component over a fine range is desired (e.g., medical devices). As another example, at least some of the components disclosed herein are not necessarily limited to be considered part of only one of the positioning subsystems disclosed herein. For instance, the first and second flexures 254, 256 and the head carriage 132 both serve as part of the fine linear travel subsystem 116 and the rotary actuator 200. As a further example, the fine and coarse travel subsystems 116, 144 are not limited to the specific arrangements disclosed herein.

Embodiments disclosed herein can be implemented as one or more computer program products, i.e., one or more modules of computer program instructions encoded on a computer-readable medium for execution by, or to control the operation of, data processing apparatus. For example, the logic or software of the servo control system 27 that manipulates the rotary actuator 200 may be provided in such computer-readable medium of the tape drive 10 (e.g., on a circuit board) and executed by a corresponding processor or processing engine (not shown). The computer-readable medium can be a machine-readable storage device, a machine-readable storage substrate, a non-volatile memory device, a composition of matter affecting a machine-readable propagated signal, or a combination of one or more of them. In this regard, the tape drive 10 may encompass one or more apparatuses, devices, and machines for processing data, including by way of example a programmable processor, a computer, or multiple processors or computers. In addition to hardware, the tape drive 10 may include code that creates an execution environment for the computer program in question, e.g., code that constitutes processor firmware, a protocol stack, a database management system, an operating system, or a combination of one or more of them.

While this disclosure contains many specifics, these should not be construed as limitations on the scope of the disclosure or of what may be claimed, but rather as descriptions of features specific to particular embodiments of the disclosure. Furthermore, certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

The above described embodiments including the preferred embodiment and the best mode of the invention known to the inventor at the time of filing are given by illustrative examples only.

We claim:

1. A rotary actuator, comprising:
   a first subassembly comprising a first magnetically conductive core having an inner surface and an outer surface, an electrically conductive coil including a plurality of windings wrapped over the inner and outer surfaces of the cylindrical core, and a first central axis; and
   a second subassembly spaced from the first subassembly by an air gap, wherein the second subassembly comprises a second magnetically conductive core, at least one magnet connected to the second magnetically conductive cylindrical core, and a second central axis;
   wherein the first and second central axes are collinear, and wherein transmission of an electric current through the electrically conductive coil induces rotation of one of the first and second subassemblies relative to the other of the first and second subassemblies about one of the first and second central axes.

2. The rotary actuator of claim 1, wherein the transmitted electric current travels through a first portion of the electrically conductive coil in a first current flow direction over the inner and outer surfaces of the first magnetically conductive core in a first direction about the first central axis, wherein the transmitted electric current travels through a second portion of the electrically conductive coil in a second current flow direction over the inner and outer surfaces of the first magnetically conductive core in the first direction about the first central axis, and wherein the first current flow direction is opposite to the second current flow direction.

3. The rotary actuator of claim 2, wherein the windings of the first coil portion are successively wrapped in a first winding direction over the inner and outer surfaces of the first magnetically conductive core in the first direction about the first central axis, wherein the windings of the second coil portion are successively wrapped in a second winding direction over the inner and outer surfaces of the first magnetically conductive core in the first direction about the first central axis, and wherein the first winding direction is opposite to the second winding direction.

4. The rotary actuator of claim 2, wherein an end of one of the first and second coil portions is electrically connected to an opposed end of the other of the first and second coil portions.

5. The rotary actuator of claim 2, wherein the at least one magnet generates a magnetic flux path through the rotary actuator assembly that passes successively through the first portion of the electrically conductive coil, the first magnetically conductive core and the second portion of the electrically conductive coil.

6. The rotary actuator of claim 5, wherein after passing through the second portion of the electrically conductive coil, the magnetic flux path passes through the at least one magnet, the second magnetically conductive core, the at least one magnet, and the first portion of the electrically conductive coil.

7. The rotary actuator of claim 2, wherein the transmitted electric current travels through a third portion of the electrically conductive coil in the first current flow direction over the inner and outer surfaces of the first magnetically conductive core in the first direction about the first central axis, and wherein the transmitted electric current travels through a fourth portion of the electrically conductive coil in the second current flow direction over the inner and outer surfaces of the first magnetically conductive core in the first direction about the first central axis.

8. The rotary actuator of claim 1, wherein the first and second subassemblies are nonconcentric.

9. The rotary actuator of claim 8, further comprising:
   a third subassembly spaced from the first subassembly by an air gap, wherein the third subassembly comprises a third magnetically conductive core, at least one magnet rigidly connected to the third magnetically conductive core, and a third central axis, wherein the third central axis is collinear with the first and second central axes, and wherein the first and third subassemblies are nonconcentric.

10. The rotary actuator of claim 1, wherein the first and second subassemblies are concentric.

11. The rotary actuator of claim 10, wherein the first subassembly is disposed within the second subassembly.

12. The rotary actuator of claim 10, wherein the second subassembly is disposed within the first subassembly.

13. The rotary actuator of claim 12, further comprising:
   a third subassembly spaced from the first subassembly by an air gap, wherein the third subassembly comprises a third magnetically conductive core, at least one magnet rigidly connected to the third magnetically conductive core, and a third central axis, wherein the third central axis is collinear with the first and second central axes, and wherein the first and second subassemblies are disposed within the third subassembly.

14. A rotary actuator assembly, comprising:
   a first subassembly comprising a first magnetically conductive core, an electrically conductive coil including a plurality of windings wrapped over the conductive core, and a first central aperture;
   a second subassembly comprising a second magnetically conductive core, at least one magnet rigidly connected to the second magnetically conductive core, and a second central aperture; and
   a shaft subassembly received in the central apertures of the first and second subassemblies and having at least a first portion that is rigidly connected to one of the first and second subassemblies, wherein the first and second subassemblies are spaced from the central apertures of each other by an air gap, and wherein transmission of an electric current through the electrically conductive coil induces rotation of the one of the first and second subassemblies and the first portion of the shaft subassembly relative to the other of the first and second subassemblies.

15. The rotary actuator assembly of claim 14, wherein the shaft subassembly further comprises:
   a second portion received in the central aperture of the one of the first and second subassemblies, wherein the second portion is non-movable relative to the other of the first and second subassemblies; and
   a bearing subassembly disposed between the first and second portions of the shaft subassembly and that facilitates rotation of the first portion relative to the second portion.

16. A drive for reading and/or writing recording media, comprising:
   the rotary actuator assembly of claim 14; and
   at least one recording head interconnected to the one of the first and second subassemblies, wherein rotation of the one of the first and second subassemblies induces rotation of the at least one recording head.

17. The rotary actuator assembly of claim 14, wherein the first magnetically conductive core includes an inner surface surrounding the central aperture and an opposed outer surface, and wherein the plurality of windings are wrapped over the inner and outer surfaces of the first magnetically conductive core.

18. The rotary actuator assembly of claim 17, wherein the transmitted electric current travels through a first portion of the electrically conductive coil in a first current flow direction over the inner and outer surfaces of the first magnetically conductive core in a first direction about the first central axis, wherein the transmitted electric current travels through a second portion of the electrically conductive coil in a second current flow direction over the inner and outer surfaces of the first magnetically conductive core in the first direction about the first central axis, and wherein the first current flow direction is opposite to the second current flow direction.

19. A head positioning assembly for a data storage drive, comprising:
  at least one recording head configured to read data from and/or write data to storage media;
  a first travel carriage configured to move the at least one recording head in a lateral direction relative to the storage media; and
  a rotary actuator that rotates the at least one recording head about an axis that is perpendicular to the storage media, wherein the rotary actuator comprises:
    a first subassembly comprising a first magnetically conductive cylindrical core having an inner surface and an outer surface and an electrically conductive coil including a plurality of windings wrapped over the inner and outer surfaces of the cylindrical core; and
    a second subassembly comprising a second magnetically conductive cylindrical core and at least one magnet rigidly connected to the second magnetically conductive cylindrical core;
    wherein one of the first and second subassemblies is non-movable relative to the first travel carriage, wherein the other of the first and second subassemblies is non-rotatable relative to the at least one recording head, wherein the second subassembly is spaced from the first subassembly by an air gap.

20. The head positioning assembly of claim 19, wherein the first travel carriage is configured to move the at least one recording head in a lateral direction relative to the storage media over a first lateral range, and wherein the head positioning assembly further comprises:
  a second travel carriage configured to move the at least one recording head in a lateral direction relative to the storage media over a second lateral range that is finer than the first lateral range, wherein the second lateral carriage is non-rotatable relative to the other of the first and second subassemblies.

* * * * *

UNITED STATES PATENT AND TRADEMARK OFFICE
CERTIFICATE OF CORRECTION

PATENT NO. : 9,824,706 B2
APPLICATION NO. : 14/068368
DATED : November 21, 2017
INVENTOR(S) : Yeakley et al.

Page 1 of 1

It is certified that error appears in the above-identified patent and that said Letters Patent is hereby corrected as shown below:

In the Specification

In Column 4, Line 22, delete "coil" and insert -- coil. --, therefor.

In Column 8, Line 26, delete "7b)" and insert -- 7b). --, therefor.

In Column 13, Line 57, delete "generatea" and insert -- generate a --, therefor.

In Column 14, Line 53, delete "sub combination." and insert -- subcombination. --, therefor.

Signed and Sealed this
Thirty-first Day of July, 2018

Andrei Iancu
*Director of the United States Patent and Trademark Office*